United States Patent
Guidash et al.

(10) Patent No.: US 7,238,926 B2
(45) Date of Patent: Jul. 3, 2007

(54) SHARED AMPLIFIER PIXEL WITH MATCHED COUPLING CAPACITANCES

(75) Inventors: R. Michael Guidash, Rochester, NY (US); Ravi Mruthyunjaya, Penfield, NY (US); Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/398,514

(22) Filed: Apr. 5, 2006

(65) Prior Publication Data
US 2006/0273240 A1 Dec. 7, 2006

Related U.S. Application Data

(60) Provisional application No. 60/686,160, filed on Jun. 1, 2005.

(51) Int. Cl.
*H01L 27/00* (2006.01)
*H04N 5/335* (2006.01)

(52) U.S. Cl. .................. 250/208.1; 348/308; 257/292

(58) Field of Classification Search ............. 250/208.1, 250/214.1; 348/301, 302, 308; 257/292, 257/291
See application file for complete search history.

(56) References Cited

U.S. PATENT DOCUMENTS

| 2004/0012697 | A1 | 1/2004 | Rossi |
| 2005/0012836 | A1 | 1/2005 | Guidash |
| 2005/0110884 | A1 | 5/2005 | Altice, Jr. et al. |
| 2006/0146161 | A1* | 7/2006 | Farrier .................. 348/308 |

* cited by examiner

*Primary Examiner*—Kevin Pyo
(74) *Attorney, Agent, or Firm*—Peyton C. Watkins

(57) ABSTRACT

A method of making an image sensor, the method includes the steps of providing a plurality of pixels each with a photodetector; providing an amplifier that is shared between the plurality of photodetectors; providing a transfer gate associated with each photodetector; providing a charge-to-voltage conversion region that is shared between the plurality of photodetectors; determining a capacitance between each transfer gate and the charge-to-voltage conversion region; and modifying the capacitance to be substantially the same by altering a physical structure within one or more pixels.

11 Claims, 3 Drawing Sheets

SHARED AMPLIFIER PIXEL WITH MATCHED COUPLING CAPACITANCES

CROSS REFERENCE TO RELATED APPLICATIONS

This is a 111A application of Provisional Application Ser. No. 60/686,160, filed Jun. 1, 2005.

FIELD OF THE INVENTION

The invention relates generally to the field of CMOS image sensors. More specifically, the invention relates to such image sensors sharing an amplifier that includes matching the capacitance between the transfer gate and floating diffusion for each pixel for reducing fixed pattern noise.

BACKGROUND OF THE INVENTION

In FIG. 1, the prior art, shared pixel schematic comprises two photodetectors (PD1 and PD2), two transfer gates (TG1 and TG2), a row select transistor (RSEL), a common floating diffusion sense node (FD), a reset transistor with a reset gate (RG) and a source follower input transistor (SF). The prior art pixel of FIG. 2 is a similar concept except that four PDs and TGs share common components.

These designs created coupling capacitance between the TGs and FD that produced a fixed pattern noise that is correlated to the mismatch in the capacitance of each of the TGs to the common FD. For example, if the capacitance in from TG1 to FD ($C_{TG1-FD}$) in the pixel in FIG. 1 was different than that of TG2 to FD ($C_{TG2-FD}$), then there would be a row correlated odd-even, or modulo-2, fixed pattern noise during readout associated with the mismatch of the aforementioned capacitances.

A similar effect is noted in the 4-shared pixels as shown in FIG. 2. The mismatch in the capacitances ($C_{TG1-FD}$), ($C_{TG2-FD}$), ($C_{TG3-FD}$) and ($C_{TG4-FD}$) led to a row correlated modulo-4 fixed pattern noise. Because the fixed pattern noise is highly spatially correlated it is very easy to detect at low levels and degrades image quality. The TG-FD capacitances include the TG overlap capacitance and the parasitic capacitances associated with the interconnect within the pixel.

The present invention eliminates the fixed pattern noise by doing detailed layout and design to produced matched capacitances for $TG_i$ to FD for shared amplifier pixels. This can be done by, but not limited to, identical placement of TG wiring and use of the same level of interconnect within each pixel with respect to the FD junction areas and interconnect. Use of post layout extraction tools and other integrated circuit capacitance modeling tools can be used to design the required level of matching. In some cases this could require purposeful addition of parasitic capacitance to one or more $TG_i$-FD regions to produce matched TG-FD coupling capacitance.

SUMMARY OF THE INVENTION

The present invention is directed to overcoming one or more of the problems set forth above. Briefly summarized, according to one aspect of the present invention, the invention resides in a method of making an image sensor, the method includes the steps of (a) providing a plurality of pixels each with a photodetector; (b) providing an amplifier that is shared between the plurality of photodetectors; (c) providing a transfer gate associated with each photodetector; (d) providing a charge-to-voltage conversion region that is shared between the plurality of photodetectors; (e) determining a capacitance between each transfer gate and the charge-to-voltage conversion region; and (f) modifying the capacitance to be substantially the same by altering a physical structure within one or more pixels.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantage of eliminating the fixed pattern noise by doing detailed layout and design to produced matched capacitances for $TG_i$ to FD for shared amplifier pixels. This can be done by, but not limited to, identical placement of TG wiring and use of the same level of interconnect within each pixel with respect to the FD junction areas and interconnect. Use of post layout extraction tools and other integrated circuit capacitance modeling tools can be used to design the required level of matching. In some cases this could require purposeful addition of parasitic capacitance to one or more $TG_i$-FD regions to produce matched TG-FD coupling capacitance.

DETAILED DESCRIPTION OF THE INVENTION

Figure 1:
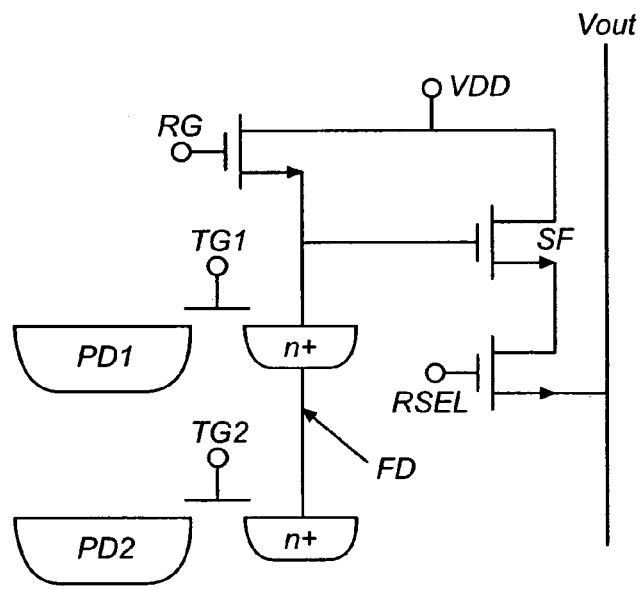
FIG. 1 is a schematic of two pixels sharing an amplifier of the prior art.
Figure 2:
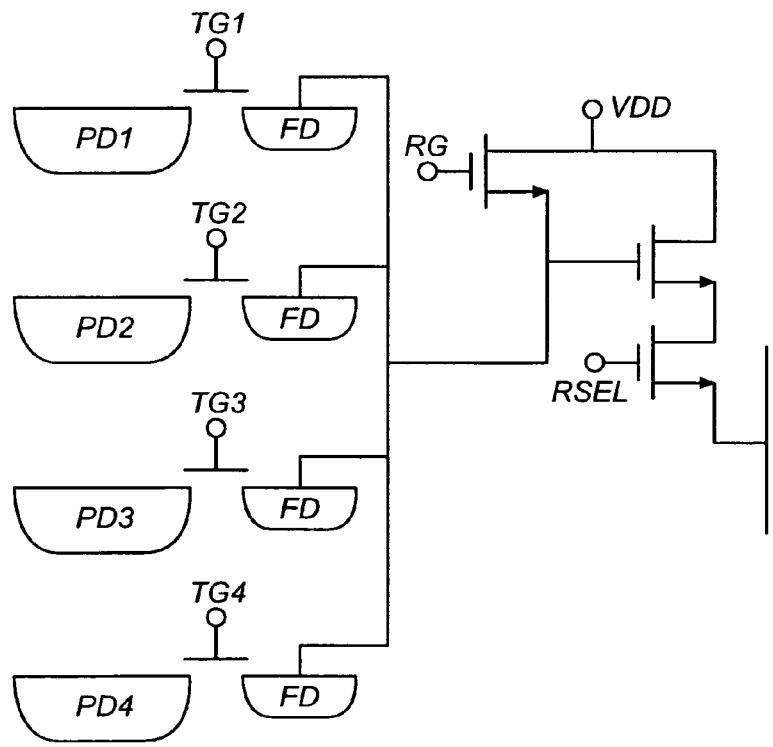
FIG. 2 is a schematic of four pixels sharing an amplifier of the prior art.
Figure 3:
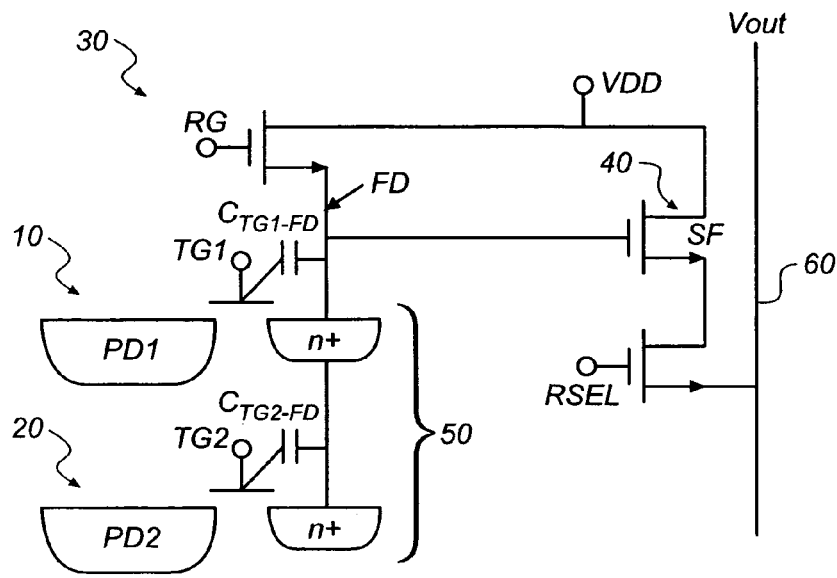
FIG. 3 is a schematic of the present invention of two pixels sharing an amplifier.
Figure 4:
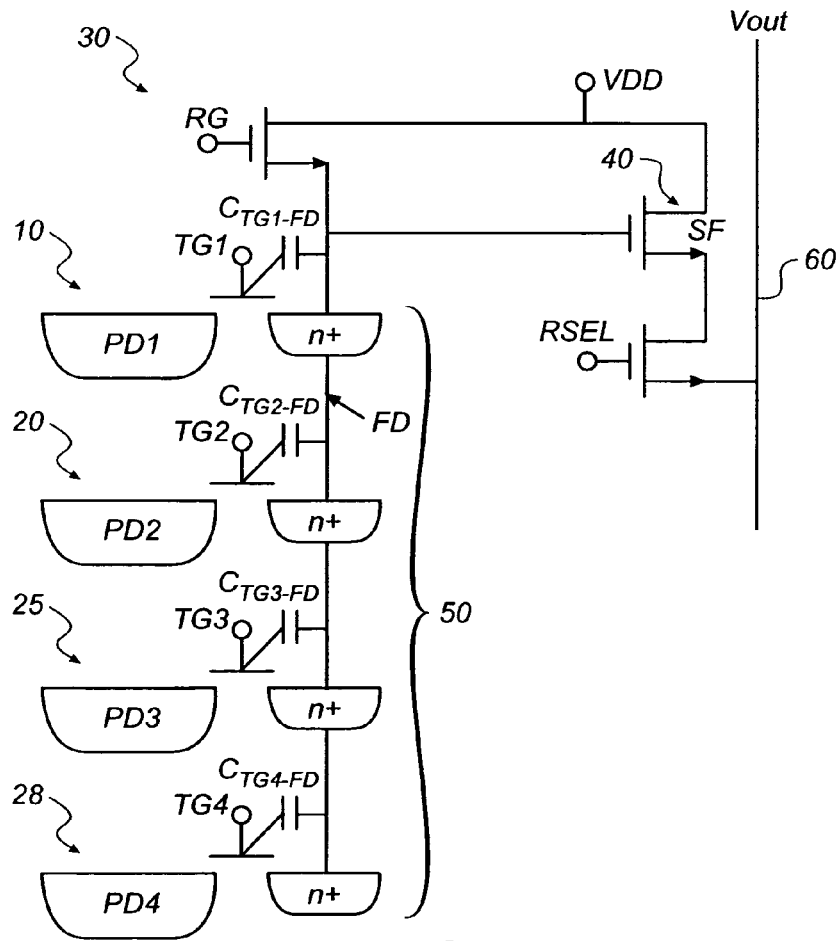
FIG. 4 is a schematic of the present invention of four pixels sharing an amplifier.

Referring to FIG. 3, there is shown two pixels 10 and 20 of an image sensor 30 (only a portion of the image sensor is shown) sharing an amplifier 40, preferably a source follower SF. The image sensor 30, preferably an active pixel image sensor, includes a two dimensional array of pixels; however, for clarity of understanding, FIG. 3 shows two pixels for illustrating a two shared design (2S) and FIG. 4 illustrates a four shared design (4S). Active pixel refers to a pixel having a transistor used as an active circuit element in or associated with the pixel, and CMOS refers to "complimentary metal oxide silicon" in which two transistors of opposite doping (one p-type doping and one n-type doping) are wired together in complimentary fashion. An active pixel typically uses a CMOS design and are used interchangeably in the industry.

Referring to FIG. 3, each pixel 10 and 20 includes a photodiode PD1 and PD2 for capturing incident light that is converted into charge. Each pixel 10 and 20 also includes a transfer gate TG1 and TG2 for transferring charge from the photodiodes PD1 and PD2 to a shared floating diffusion 50 and its associated and shared source follower transistor SF 40. A reset gate RG functions to reset the floating diffusion 50 to a predetermined charge level, and a row select gate RSEL selects the particular row for read out.

The operation occurs in the following manner. After integration of the photodiodes PD1 and PD2, the row select gate RSEL is turned on, and the floating diffusion 50 is then reset by pulsing the reset gate RG. This reset signal is then read out. The transfer gate TG1 is pulsed on and the signal charge from the photodetector PD1 is transferred onto the floating diffusion 50, and the signal level is read out via the amplifier SF 40, where the signal is amplified, and onto the readout bus 60. Next, the floating diffusion 50 is reset by pulsing on the reset gate RG again. The reset level for this row is read out. The other transfer gate TG2 is then pulsed for transferring charge to the floating diffusion 50. This signal level is then read out via the amplifier SF 40, where the signal is amplified, and onto the readout bus 60. This procedure is then repeated for the remaining rows on the device.

It is significant to note that the capacitance of each transfer gate TG1 and TG2 to the floating diffusion 50 is matched to be substantially the same. This is represented symbolically by the capacitors $C_{TG1-FD}$ and $C_{TG2-FD}$. The matching of the capacitance can be done by, but not limited to, identical placement of transfer gate wiring. Still further, the same level of interconnect within each pixel with respect to the floating diffusion junction areas and interconnect. The use of post layout extraction tools and other integrated circuit capacitance modeling tools can be used to design the required level of matching. In some cases, this could require purposeful addition of parasitic capacitance to one or more transfer gate-floating diffusion regions to produce matched transfer gate-floating diffusion coupling capacitance.

Referring to FIG. 4, four pixels sharing common components is shown. These pixels 10, 20, 25 and 28 are similar in concept and operation as that of FIG. 3 except that four photodiodes and transfer gates share common components instead of two photodiode and transfer gates sharing common components. Again, the capacitances of the transfer gates to the floating diffusion are matched using the same capacitance matching described hereinabove. This matched capacitance is indicated symbolically by the four capacitors $C_{TG1-FD}$, $C_{TG2-FD}$, $C_{TG3-FD}$, and $C_{TG4-FD}$.

Figure 5:
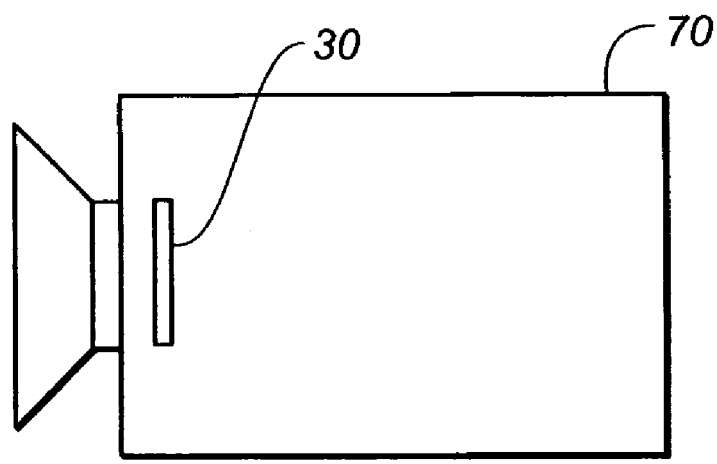
FIG. 5 is an illustration of a digital camera for illustrating a typical commercial embodiment to which the ordinary consumer is accustomed.

Referring to FIG. 5, there is shown a digital camera 70 containing the image sensor 30 of the present invention for illustrating a typical commercial embodiment to which the ordinary consumer is acquainted.

The invention has been described with reference to a preferred embodiment. However, it will be appreciated that variations and modifications can be effected by a person of ordinary skill in the art without departing from the scope of the invention.

PARTS LIST 10 pixel
20 pixel
25 pixel
28 pixel
30 image sensor
40 amplifier SF
50 shared floating diffusion
60 readout bus
70 digital camera

The invention claimed is:

1. A method of making an image sensor, the method comprising the steps of:
   (a) providing a plurality of pixels each with a photodetector;
   (b) providing an amplifier that is shared between the plurality of photodetectors;
   (c) providing a transfer gate associated with each photodetector;
   (d) providing a charge-to-voltage conversion region that is shared between the plurality of photodetectors;
   (e) determining a capacitance between each transfer gate and the charge-to-voltage conversion region; and
   (f) modifying the capacitance to be substantially the same by altering a physical structure within one or more pixels.

2. The method as in claim 1 wherein step (f) includes altering interconnects within one or more pixels.

3. The method as in claim 1 wherein step (f) includes altering a physical design of the one or more charge-to-voltage conversion regions.

4. The method as in claim 1 wherein step (f) includes altering a physical design of one or more transfer gates.

5. The method as in claim 1 further comprising the step of making a CMOS image sensor.

6. An image sensor comprising:
   (a) a plurality of pixels each with a photodetector;
   (b) an amplifier that is shared between the plurality of photodetectors;
   (c) a transfer gate associated with each photodetector;
   (d) a charge-to-voltage conversion region that is shared between the plurality of photodetectors; wherein a capacitance between each transfer gate and the charge-to-voltage conversion region is substantially the same.

7. The image sensor as in claim 6 further comprising interconnects that provide substantially matched capacitance.

8. The image sensor as in claim 6, wherein the image sensor is a CMOS image sensor.

9. A digital camera comprising:
   an image sensor comprising:
   (a) a plurality of pixels each with a photodetector;
   (b) an amplifier that is shared between the plurality of photodetectors;
   (c) a transfer gate associated with each photodetector;
   (d) a charge-to-voltage conversion region that is shared between the plurality of photodetectors; wherein a capacitance between each transfer gate and the charge-to-voltage conversion region is substantially the same.

10. The digital camera as in claim 9 further comprising interconnects that provide substantially matched capacitance.

11. The digital camera as in claim 9, wherein the image sensor is a CMOS image sensor.

* * * * *